United States Patent
Cahill et al.

(10) Patent No.: US 11,386,872 B2
(45) Date of Patent: Jul. 12, 2022

(54) EXPERIENCING A VIRTUAL OBJECT AT A PLURALITY OF SIZES

(71) Applicant: Microsoft Technology Licensing, LLC, Redmond, WA (US)

(72) Inventors: Jason Matthew Cahill, Woodinville, WA (US); Torfi Frans Olafsson, Kirkland, WA (US); Jesse Dylan Merriam, Bothell, WA (US); Michael Meincke Persson, Redmond, WA (US); Bradley Reid Shuber, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 559 days.

(21) Appl. No.: 16/277,676

(22) Filed: Feb. 15, 2019

(65) Prior Publication Data

US 2020/0265806 A1  Aug. 20, 2020

(51) Int. Cl.
*G09G 5/373* (2006.01)
*A63F 13/25* (2014.01)
(Continued)

(52) U.S. Cl.
CPC ............. *G09G 5/373* (2013.01); *A63F 13/25* (2014.09); *A63F 13/40* (2014.09); *G06T 3/40* (2013.01);
(Continued)

(58) Field of Classification Search
CPC ............. G09G 5/373; G09G 2340/045; G09G 2340/12; G09G 2354/00; A63F 13/25;
(Continued)

(56) References Cited

U.S. PATENT DOCUMENTS 6,084,587 A * 7/2000 Tarr ........................ G06T 15/00
345/419
2015/0310669 A1  10/2015  Kamat et al.
(Continued)

FOREIGN PATENT DOCUMENTS

| CN | 106406513 A | 2/2017 |
|---|---|---|
| WO | 2016130895 A1 | 8/2016 |
| WO | 2017168404 A1 | 10/2017 |

OTHER PUBLICATIONS

Dias, Lashan, "Solidhaus Launches an Augmented Reality App for Architecture & Construction", Retrieved from https://solidhaus.com/architecture-augmented-reality-app/, Jul. 17, 2017, 6 Pages.
(Continued)

*Primary Examiner* — William H McCulloch, Jr.
*Assistant Examiner* — Ankit Doshi
(74) *Attorney, Agent, or Firm* — Rainier Patents, P.S.

(57) ABSTRACT

Described herein is a system and method for experiencing a virtual object at a plurality of sizes. During an AR session, the virtual object can created at a first size based upon a first scale (e.g., miniature, tabletop size). Once created, information regarding the virtual object can be stored. Thereafter, the virtual object can be displayed in an AR session at a second size based upon a second scale (e.g., full size or life size). In some embodiments, functionality of at least portion(s) of the virtual object are different when experienced in an AR session at the second size than when experienced in an AR session at the first size.

20 Claims, 6 Drawing Sheets

(51) Int. Cl.
*A63F 13/40* (2014.01)
*G06T 3/40* (2006.01)
*G06T 11/60* (2006.01)

(52) U.S. Cl.
CPC ......... *G06T 11/60* (2013.01); *A63F 2300/303* (2013.01); *A63F 2300/308* (2013.01); *G09G 2340/045* (2013.01); *G09G 2340/12* (2013.01); *G09G 2354/00* (2013.01)

(58) Field of Classification Search
CPC ................ A63F 13/40; A63F 2300/303; A63F 2300/308; G06T 3/40; G06T 11/60
See application file for complete search history.

(56) References Cited

U.S. PATENT DOCUMENTS

| | | | |
|---|---|---|---|
| 2016/0012640 | A1 | 1/2016 | Abraham |
| 2016/0078683 | A1 | 3/2016 | Sudol et al. |
| 2016/0210781 | A1 | 7/2016 | Thomas et al. |
| 2017/0061700 | A1* | 3/2017 | Urbach ............... G06F 3/04883 |
| 2017/0228921 | A1 | 8/2017 | Buhlmann et al. |
| 2017/0270715 | A1 | 9/2017 | Lindsay et al. |
| 2018/0046861 | A1 | 2/2018 | Patel et al. |
| 2018/0075657 | A1 | 3/2018 | Lanier et al. |
| 2018/0321894 | A1 | 11/2018 | Paulovich et al. |
| 2018/0330542 | A1 | 11/2018 | Bharti et al. |

OTHER PUBLICATIONS

"Choose Your Next Car Using Augmented Reality!", Retrieved From: https://www.youtube.com/watch?v=5bqY3EfoKII&feature=youtu.be, Apr. 6, 2018, 3 Pages.

"Create Your Own World!—Assemblr", Retrieved From: https://www.youtube.com/watch?v=FbR4c9I2Dys&feature=youtu.be, Nov. 15, 2017, 3 Pages.

"Legos with ARKit2 (with conmentary)", Retrieved From: https://www.youtube.com/watch?v=JwSIKwuT8VI&feature=youtu.be, Jun. 4, 2018, 3 Pages.

"Realar Demonstration—Walk Inside your New Virtual Home in Augmented Reality", Retrieved From: https://www.youtube.com/watch?v=A4LuGzwvARU&feature=youtu.be, Feb. 21, 2018, 5 Pages.

Anand, Parth, "ARKit Unity Tutorial : Scale and Rotate Virtual Models Using Touch Gestures", Retrieved From: https://www.youtube.com/watch?v=EUxiW_7W8rw&feature=youtu.be, Jan. 16, 2018, 5 Pages.

"International Search Report and Written Opinion Issued in PCT Application No. PCT/US20/015994", dated May 18, 2020, 19 Pages.

Webb, Chilton, "Scaling Test for AR Showcase Factory", Retrieved From: https://www.youtube.com/watch?v=wThVKZGoHNY&feature=youtu.be, Mar. 6, 2018, 7 Pages.

\* cited by examiner

EXPERIENCING A VIRTUAL OBJECT AT A PLURALITY OF SIZES

BACKGROUND

Augmented reality (AR) systems such as video games display real world images overlaid with a virtual experience (e.g., interactive three-dimensional object(s)). An AR system thus enables a participant to view real-world imagery in combination with context-relevant, computer-generated imagery (e.g., virtual object(s)). Imagery from the real-world and the computer-generated are combined and presented to a user such that they appear to share the same physical space.

SUMMARY

Described herein is a system for experiencing a virtual object at a plurality of sizes, comprising: a computer comprising a processor and a memory having computer-executable instructions stored thereupon which, when executed by the processor, cause the computer to: store information regarding a virtual object at a first scale; receive user input to experience the virtual object at a second scale; and during an augmented reality session, provide information for display of the virtual object at the second scale based, at least in part, upon the stored information regarding the virtual object, wherein the first scale is different than the second scale.

Also described herein is a method for experiencing a virtual object at a plurality of sizes, comprising: receiving input from one or more users creating a virtual object at a first scale during a first augmented reality session; storing information regarding the created virtual object; receiving user input to experience the created virtual object at a second scale during a second augmented reality session; and during the second augmented reality session, providing information for display of the virtual object at the second scale based, at least in part, upon the stored information regarding the created virtual object, wherein the first scale is different than the second scale.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
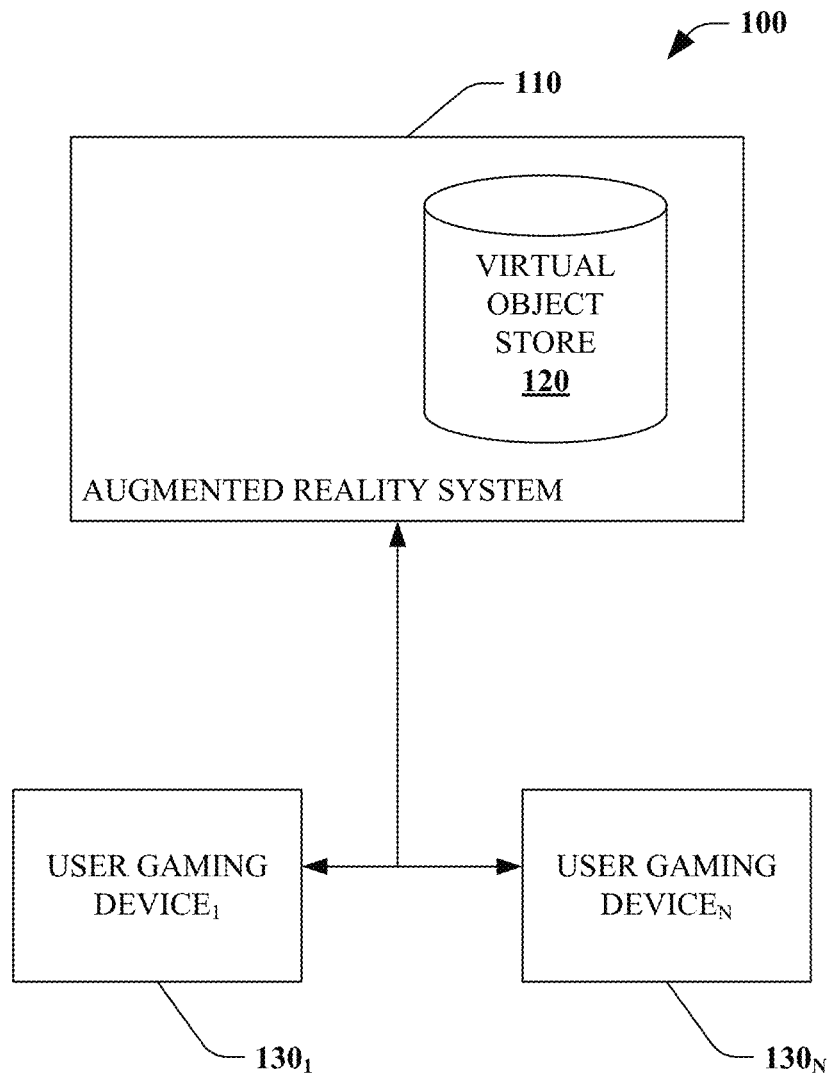
FIG. 1 is a functional block diagram that illustrates a system for experiencing a virtual object at a plurality of sizes.

Various technologies pertaining to enabling experiencing a virtual object at a plurality of sizes are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding enabling experiencing a virtual object at a plurality of sizes. What follows are one or more exemplary systems and methods.

Aspects of the subject disclosure pertain to the technical problem of experiencing a virtual object at a plurality of sizes. The technical features associated with addressing this problem involve receiving input from one or more users creating a virtual object at a first scale during a first augmented reality session; storing information regarding the created virtual object; receiving user input to experience the created virtual object at a second scale during a second augmented reality session; and during the second augmented reality session, providing information for display of the virtual object at the second scale based, at least in part, upon the stored information regarding the created virtual object, wherein the first scale is different than the second scale. Accordingly, aspects of these technical features exhibit technical effects of more efficiently and effectively experiencing virtual item(s) within a physical environment, for example, reducing consumption of computer resource(s) and/or network bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

"User gaming device" refers to a moveable individual computing device including, for example, a mobile phone, a laptop, a tablet, a phablet, a personal digital assistant ("PDA"), an e-reader, a wearable computer, a head-mounted display (HMD), or any other moveable computing device having components for displaying and/or interacting with an augmented reality session. A "real object" is one that exists in an AR participant's surroundings. A "virtual object" is a computer-generated construct (e.g., three-dimensional) that does not exist in the participant's physical surroundings, but may be experienced (e.g., seen, heard, etc.) via the AR technology.

AR systems such as video games display real world images overlaid with a virtual experience (e.g., interactive three-dimensional virtual object(s)). An AR system thus enables a participant to view real-world imagery in combination with context-relevant, computer-generated imagery.

Described herein is a system for experiencing a virtual object at a plurality of sizes. During an AR session, the virtual object is created at a first size based upon a first scale (e.g., miniature, tabletop size). Once created, information regarding the virtual object can be stored. Thereafter, the virtual object can be displayed in an AR session at a second size based upon a second scale (e.g., full size or life size). In some embodiments, functionality of at least portion(s) of the virtual object are different when experienced at the second size than when experienced at the first size.

Referring to FIG. 1, a system for experiencing a virtual object at a plurality of sizes 100 is illustrated. The system 100 includes an AR system 110 having a virtual object store 120. The system 100 further includes one or more user gaming devices 130.

The AR system 110 generates a virtual experience including, for example, interactive three-dimensional virtual object(s) that are displayed on the user gaming device(s) 130 as an overlay to real world images. In some embodiments, the AR system 110 is coupled to the user gaming devices 130 via the Internet (e.g., cloud-based service). In some embodiments, the AR system 110 is coupled to the user gaming device 130 via a high speed network connection (e.g., local gaming system). In some embodiments, at least a portion of the AR system 110 can be a component of one or more of the user gaming devices 130.

In some embodiments, the user gaming devices 130 are coupled to each other via the Internet. In some embodiments, the user gaming devices 130 are coupled to each other via a high speed network connection.

During a first AR session, the AR system 110 can receive input creating, modifying, and/or viewing a virtual object at a first scale from one or more users via user gaming device(s) 130. The AR system 110 can store information regarding the virtual object (e.g., created virtual object), for example, in the virtual object store 120. The AR system 110 can then, during a second AR session, display the virtual object at a second scale which is different than the first scale. In some embodiments, the first AR session is the same AR session as the second AR session. In some embodiments, the first AR session is a different AR session than the second AR session.

In some embodiments, the information stored by the AR system 110 regarding the virtual object (e.g., created virtual object) can include identification of each of the components of the virtual object (e.g., block), and, optionally, user-modified attribute(s) (e.g., color, texture, text, labels, relative size). The AR system 110 can store AR experience information for the components such as display characteristics, audio characteristics, and/or functionality associated with the particular component at various scales. For example, for a component comprising a door, the door can be stationary when displayed/presented at a first scale and experienced as functioning when displayed/presented at a second scale.

Thus, the AR system 110 can store, for a particular virtual object, an identification of components and their relation to one another. The AR system 110 can then utilize this information along with a requested scale to generate the virtual object for display/presentation at the requested scale.

In some embodiments, the information stored by the AR system 110 regarding the virtual object (e.g., created virtual object) can include information needed to display/present the virtual object at a plurality of scales. For example, the AR system 110 can store information for the virtual object at a first scale, and, information for the created object at a second scale. Then, depending upon the request scale, the AR system 110 can display/present the virtual object at the requested scale (e.g., first scale or second scale).

In some embodiments, the AR system 110 can include an AR video game that allows user(s) to build virtual structure(s) from components (e.g., blocks) they have collected. One or more player(s) can build on a common virtual surface sometimes referred to as a "buildplate". Buildplates can comprise a virtual environment having particular preset dimensions (e.g., 8×8, 16×16, or 32×32). During an AR session, a player can select and place a buildplate on a surface, which the player and, optionally, one or more other players can engage with to build virtual structure(s) from components. For ease of building, while building the virtual structure(s), the components can be displayed at a first scale (e.g., miniature, tabletop, 1:10 scale). For example, using a 1:10 scale, a component (e.g., block) of a 1 meter cube can be displayed as a 10 centimeter cube. Once the virtual structure(s) have been built, the AR system 110 can store information regarding the virtual structure(s) in a virtual object store 120. The information can identify the components and their relations to one another, along with any user modified attributes, if any.

Figure 2:
FIG. 2 is a diagram of an exemplary user interface.

Turning briefly to FIG. 2, an exemplary user interface 200 is illustrated. The user interface 200 illustrates a buildplate 210 upon which one or more users have created a virtual object 220 at a first scale.

Returning to FIG. 1, thereafter, one or more users can indicate a desire to experience the virtual structure at a second scale (e.g., life-size). The AR system 110 can then display the virtual structure at the second scale (e.g., life-size) based, at least in part, open the stored information. In some embodiments, a particular component can have the same, less, more, and/or different functionality when displayed in the second scale (as opposed to the first scale). For example, the particular component can be a door, which when displayed at the first scale is stationary. However, when displayed at the second scale, the door can be experienced as functioning, that is, opening and/or closing, in response to user input while experiencing the virtual structure during an AR session.

Figure 3:
FIG. 3 is a diagram of another exemplary user interface.

Turning to FIG. 3, an exemplary user interface 300 is illustrated. The user interface 300 illustrates a buildplate 310 with a virtual object 320 (the virtual object 220 of FIG. 2) at a second scale (e.g., life size).

Returning to FIG. 1, in some embodiments, all players of a multi-player AR session experience the virtual object at the same scale. In some embodiments, when displaying a virtual object created in a first scale, the virtual object is "locked" (e.g., not able to be changed) when it is displayed at a second scale. For purposes of explanation and not limitation, the system 100 has been described with two scales. In some embodiments, the system 100 can utilize three or more scales.

In some embodiments, a user can store a plurality of created virtual objects. The user can select a particular one of the virtual objects to experience at a second scale, from a gallery of created virtual objects. Additionally, the user can choose to provide information regarding one of more of the created virtual objects to particular other user(s) (e.g., shared virtual object(s)). The particular other user(s) can then experience the virtual object(s) at the first scale or at the second scale in accordance with the particular other user(s) requested scale. In some embodiments, the user can choose to publish (e.g., make public) a particular virtual object thus allowing any other user to experience the particular virtual object at the first scale or at the second scale.

In some embodiments, virtual object(s) that are viewable to a particular user can be dependent upon available physical space near (e.g., in proximity to) the user/user gaming device 130. A physical size of an area for game play/virtual object viewing can be determined, for example, as disclosed in co-pending U.S. patent application Ser. No. 16/277,465 filed on Feb. 15, 2019 entitled "System and Method for Identifying Locations for Virtual Items Within a Physical Environment, which is incorporated herein by reference) and only virtual object(s) of a size (e.g., associated physical size) displayable within the determined physical area are available for the particular user to experience.

In some embodiments, virtual object(s) can be available for experiencing based upon the location of the user/user gaming device. For example, one or more virtual objects can have an associated physical location such that when a user/user gaming device 130 is within a threshold proximity (e.g., 10 feet) of the associated physical location, the virtual object(s) are available to the particular user to experience.

Figure 4:
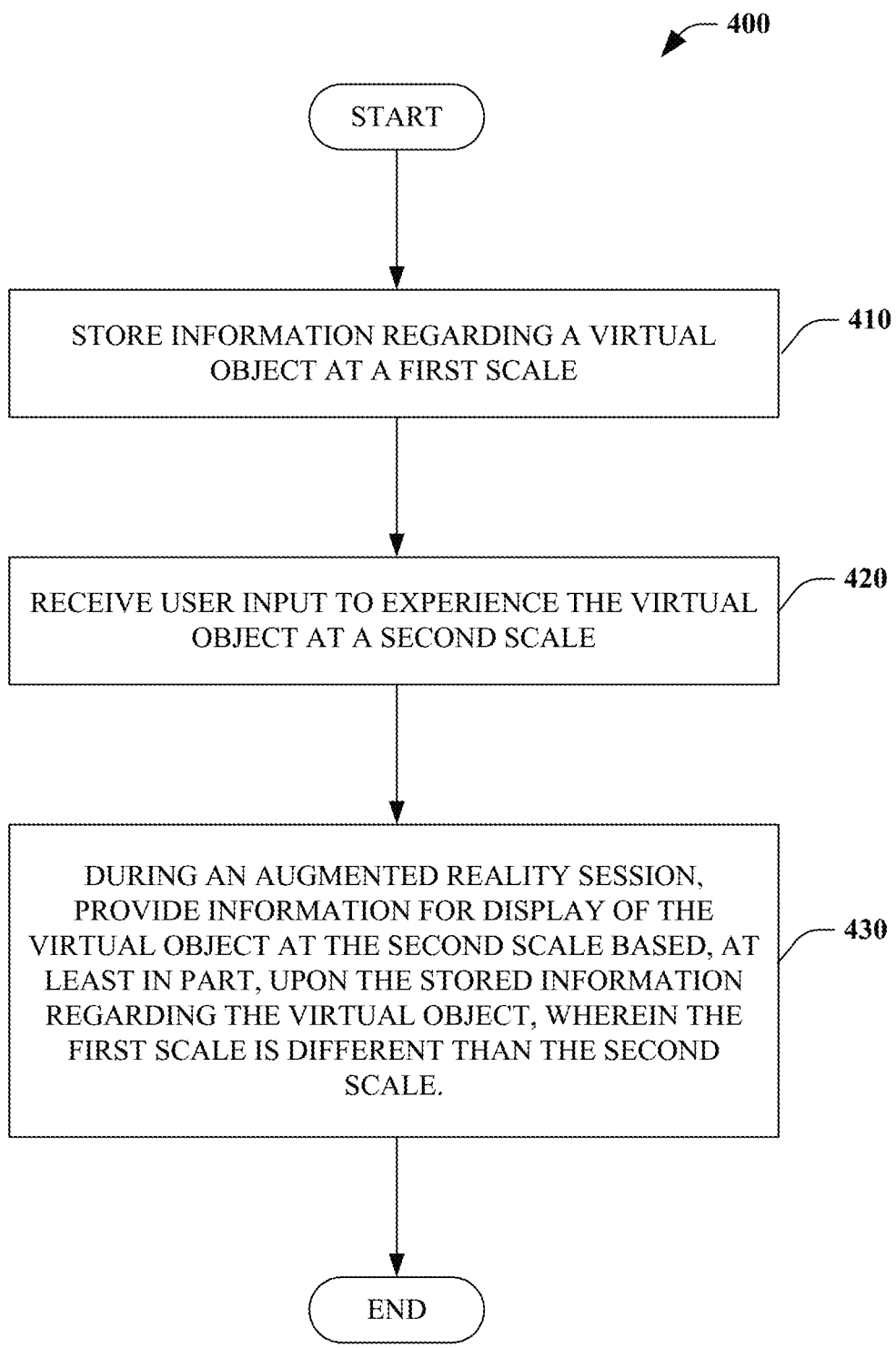
FIG. 4 is a flow chart of a method for experiencing a virtual object at a plurality of sizes.
Figure 5:
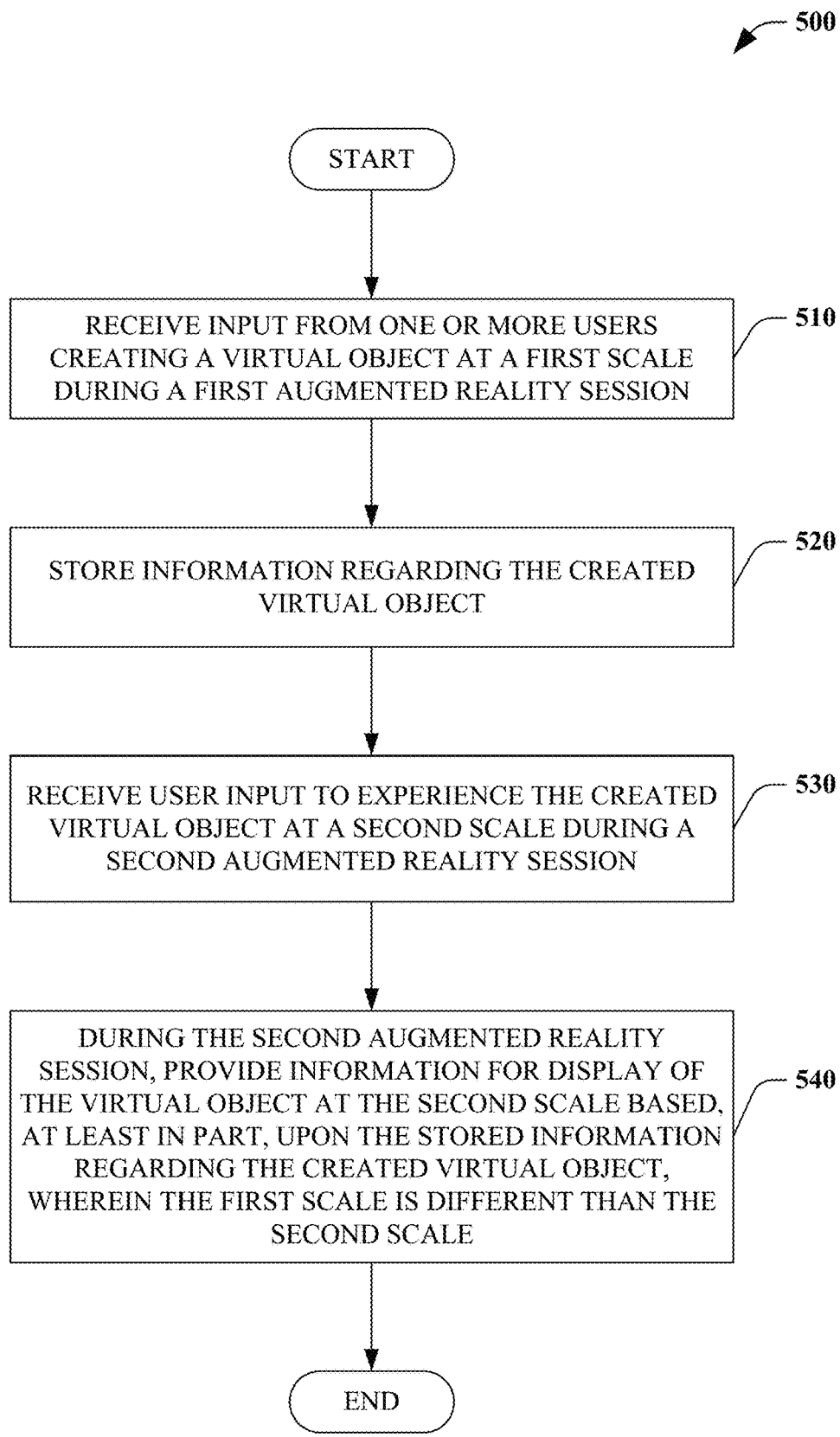
FIG. 5 is a flow chart of another method for experiencing a virtual object at a plurality of sizes.

FIGS. 4 and 5 illustrate exemplary methodologies relating for experiencing a virtual object at a plurality of sizes. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 4, a method of for experiencing a virtual object at a plurality of sizes 400 is illustrated. In some embodiments, the method 400 is performed by the system 100.

At 410, information regarding a virtual object (e.g., created virtual object) at a first scale is stored. For example, the virtual object can be created during a first AR session by one or more user. In some embodiments, the first scale is a tabletop scale.

At 420, user input to experience the virtual object at a second scale is received. At 430, during an augmented reality session, information is provided for display of the virtual object at the second scale based, at least in part, upon the stored information regarding the virtual object. The first scale is different than the second scale. In some embodiments, the second scale is a life size scale.

Turning to FIG. 5, a method of for experiencing a virtual object at a plurality of sizes 500 is illustrated. In some embodiments, the method 500 is performed by the system 100.

At 510, input is received from one or more users creating a virtual object at a first scale during a first augmented reality session. In some embodiments, the first augmented reality session is displayed via mobile phone(s) of the user(s). At 520, information regarding the created virtual object is stored.

At 530, user input to experience the created virtual object at a second scale is received during a second augmented reality session. At 540, during the second augmented reality session, information is provided for display of the virtual object at the second scale based, at least in part, upon the stored information regarding the created virtual object. The first scale is different than the second scale. In some embodiments, the second augmented reality session is displayed via mobile phone(s) of the user(s).

Described herein is a system for experiencing a virtual object at a plurality of sizes, comprising: a computer comprising a processor and a memory having computer-executable instructions stored thereupon which, when executed by the processor, cause the computer to: store information regarding a virtual object at a first scale; receive user input to experience the virtual object at a second scale; and during an augmented reality session, provide information for display of the virtual object at the second scale based, at least in part, upon the stored information regarding the virtual object, wherein the first scale is different than the second scale.

The system can further include wherein the information stored regarding the virtual object comprises identification of each component of the virtual object. The system can further include wherein the information stored regarding the virtual object further comprises user-modified attributes.

The system can include the memory having further computer-executable instructions stored thereupon which, when executed by the processor, cause the computer to: store augmented reality experience information for components of the virtual object comprising at least one of display characteristics, audio characteristics, or associated functionality at various scales; and during the augmented reality session, provide information for display of the virtual object at the second scale based, at least in part, upon the stored augmented reality experience information.

The system can further include wherein storing information regarding the virtual object comprises storing an identification of components and their relation to one another which is utilized with the second scale to generate the information for display of the virtual object at the second scale. The system can further include wherein storing information regarding the virtual object comprises storing information for the virtual object at the first scale, and, storing information for the virtual object at the second scale. The system can further include wherein the information for display of the virtual object at the second scale is further based, at least in part, upon a determined available physical space in proximity to a user gaming, and, the user gaming device comprises a mobile phone.

Described herein is a method for experiencing a virtual object at a plurality of sizes, comprising: receiving input from one or more users creating a virtual object at a first scale during a first augmented reality session; storing information regarding the created virtual object; receiving user input to experience the created virtual object at a second scale during a second augmented reality session; and during the second augmented reality session, providing information for display of the virtual object at the second scale based, at least in part, upon the stored information regarding the created virtual object, wherein the first scale is different than the second scale.

The method can further include wherein the first augmented reality session and the second augmented reality session are the same augmented reality session. The method can further include wherein the first augmented reality session and the second augmented reality session are different augmented reality sessions. The method can further include wherein the information stored regarding the created virtual object comprises identification of each component of the virtual object.

The method can further include wherein the information stored regarding the created virtual object further comprises user-modified attributes. The method can further include storing augmented reality experience information for components of the created virtual object comprising at least one of display characteristics, audio characteristics, or associated functionality at various scales. The method can further include wherein storing information regarding the created virtual object comprises storing an identification of components and their relation to one another which is utilized with the second scale to generate the information for display of the virtual object at the second scale. The method can further include wherein storing information regarding the created virtual object comprises storing information for the created virtual object at the first scale, and, storing information for the created virtual object at the second scale.

Described herein is a computer storage media storing computer-readable instructions that when executed cause a computing device to: receive input from one or more users creating a virtual object at a first scale during a first augmented reality session; store information regarding the created virtual object; receive user input to experience the created virtual object at a second scale during a second augmented reality session; and during the second augmented reality session, provide information for display of the virtual object at the second scale based, at least in part, upon the stored information regarding the created virtual object, wherein the first scale is different than the second scale.

The computer storage media can further include wherein the information stored regarding the created virtual object comprises identification of each component of the virtual object. The computer storage media of claim 16 can store further computer-readable instructions that when executed cause a computing device to: store augmented reality experience information for components of the created virtual object comprising at least one of display characteristics, audio characteristics, or associated functionality at various scales. The computer storage media can further include wherein storing information regarding the created virtual object comprises storing an identification of components and their relation to one another which is utilized with the second scale to generate the information for display of the virtual object at the second scale. The computer storage media can further include wherein storing information regarding the created virtual object comprises storing information for the created virtual object at the first scale, and, storing information for the created virtual object at the second scale.

Figure 6:
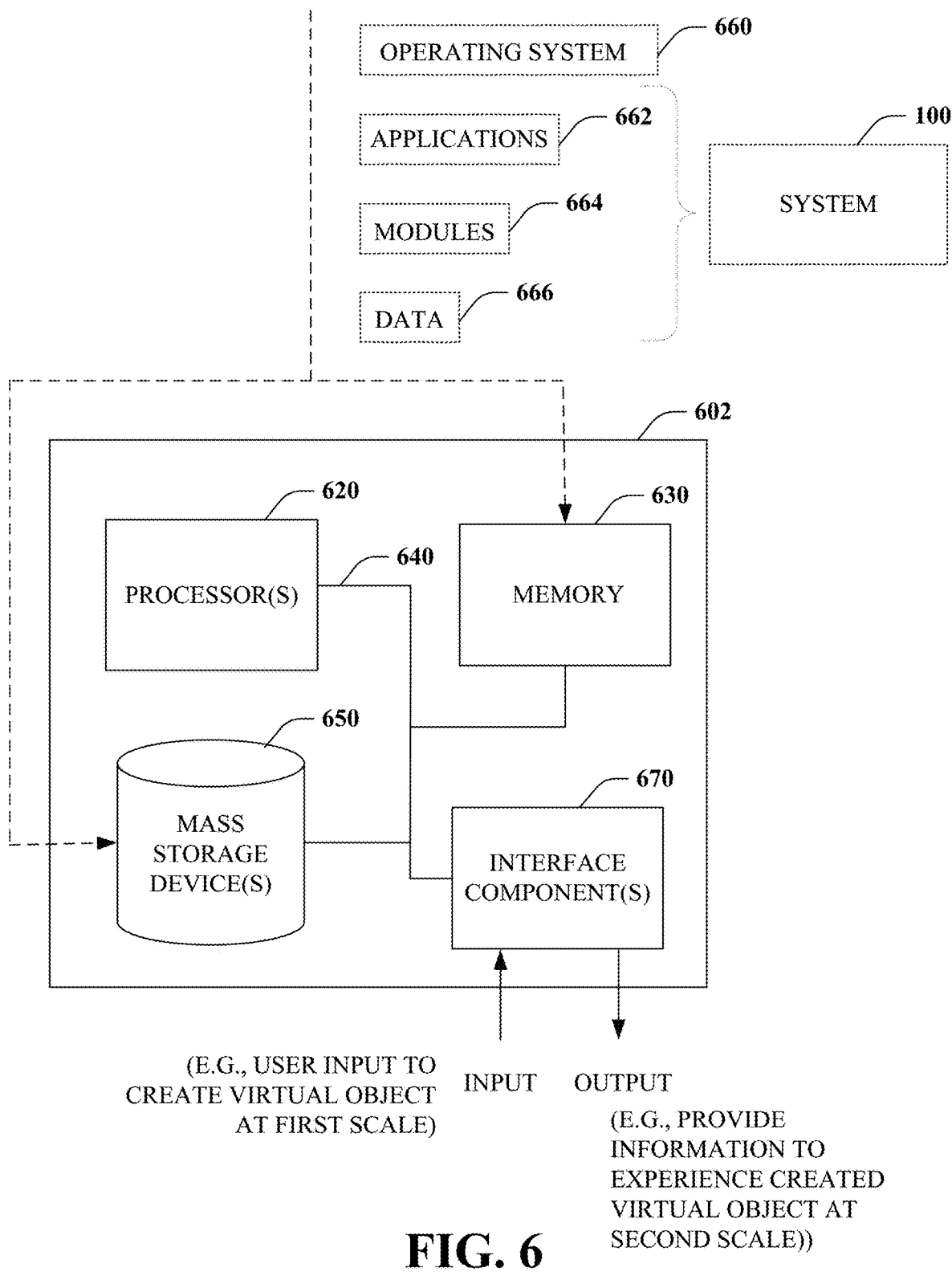
FIG. 6 is a functional block diagram that illustrates an exemplary computing system.

With reference to FIG. 6, illustrated is an example general-purpose computer or computing device 602 (e.g., mobile phone, desktop, laptop, tablet, watch, server, handheld, programmable consumer or industrial electronics, set-top box, game system, compute node, etc.). For instance, the computing device 602 may be used in a system for experiencing a virtual object at a plurality of sizes 100.

The computer 602 includes one or more processor(s) 620, memory 630, system bus 640, mass storage device(s) 650, and one or more interface components 670. The system bus 640 communicatively couples at least the above system constituents. However, it is to be appreciated that in its simplest form the computer 602 can include one or more processors 620 coupled to memory 630 that execute various computer executable actions, instructions, and or components stored in memory 630. The instructions may be, for instance, instructions for implementing functionality described as being carried out by one or more components discussed above or instructions for implementing one or more of the methods described above.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 620 can be a graphics processor.

The computer 602 can include or otherwise interact with a variety of computer-readable media to facilitate control of the computer 602 to implement one or more aspects of the claimed subject matter. The computer-readable media can be any available media that can be accessed by the computer 602 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 602. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 630 and mass storage device(s) 650 are examples of computer-readable storage media. Depending on the exact configuration and type of computing device, memory 630 may be volatile (e.g., RAM), non-volatile (e.g., ROM, flash memory, etc.) or some combination of the two. By way of example, the basic input/output system (BIOS), including basic routines to transfer information between elements within the computer 602, such as during start-up, can be stored in nonvolatile memory, while volatile memory can act as external cache memory to facilitate processing by the processor(s) 620, among other things.

Mass storage device(s) 650 includes removable/non-removable, volatile/non-volatile computer storage media for storage of large amounts of data relative to the memory 630. For example, mass storage device(s) 650 includes, but is not limited to, one or more devices such as a magnetic or optical disk drive, floppy disk drive, flash memory, solid-state drive, or memory stick.

Memory 630 and mass storage device(s) 650 can include, or have stored therein, operating system 660, one or more applications 662, one or more program modules 664, and data 666. The operating system 660 acts to control and allocate resources of the computer 602. Applications 662 include one or both of system and application software and can exploit management of resources by the operating system 660 through program modules 664 and data 666 stored in memory 630 and/or mass storage device (s) 650 to perform one or more actions. Accordingly, applications 662 can turn a general-purpose computer 602 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 662, and include one or more modules 664 and data 666 stored in memory and/or mass storage device(s) 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 602 also includes one or more interface components 670 that are communicatively coupled to the system bus 640 and facilitate interaction with the computer 602. By way of example, the interface component 670 can be a port (e.g., serial, parallel, PCMCIA, USB, FireWire, etc.) or an interface card (e.g., sound, video, etc.) or the like. In one example implementation, the interface component 670 can be embodied as a user input/output interface to enable a user to enter commands and information into the computer 602, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 670 can be embodied as an output peripheral interface to supply output to displays (e.g., LCD, LED, plasma, etc.), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
a processor; and
a memory having computer-executable instructions stored thereupon which, when executed by the processor, cause the system to:
store virtual object information regarding a virtual object, the virtual object information characterizing components of the virtual object that were displayed at a first scale when a user assembled the components to build the virtual object;
receive user input to experience the virtual object at a second scale that is different than the first scale at which the virtual object was displayed when being built;
determine relations between the components of the virtual object based at least on the virtual object information; and
during an augmented reality session, generate display information for display of the virtual object at the second scale based, at least in part, upon the stored virtual object information regarding the virtual object and the relations between the components of the virtual object.

2. The system of claim 1, wherein the virtual object information identifies each component of the virtual object.

3. The system of claim 1, wherein the virtual object information comprises user-modified attributes of the components of the virtual object.

4. The system of claim 1, the memory having further computer-executable instructions stored thereupon which, when executed by the processor, cause the system to:
store augmented reality experience information for the components of the virtual object, the augmented reality experience information comprising at least one of display characteristics, audio characteristics, or associated functionality at various scales; and
during the augmented reality session, provide the display information for display of the virtual object at the second scale based, at least in part, upon the stored augmented reality experience information.

5. The system of claim 1, wherein the virtual object information comprises first virtual object information for the virtual object at the first scale and second virtual object information for the virtual object at the second scale.

6. A method, comprising:
receiving input from one or more users creating a virtual object at a first scale during a first augmented reality session;
storing information regarding the created virtual object;
receiving user input to experience the created virtual object at a second scale during a second augmented reality session;
determining available physical space in proximity to a user gaming device; and
during the second augmented reality session, providing information for display of the virtual object at the second scale based, at least in part, upon the stored information regarding the created virtual object and the available physical space in proximity to the user gaming device, wherein the first scale is different than the second scale.

7. The method of claim 6, wherein the first augmented reality session and the second augmented reality session are the same augmented reality session.

8. The method of claim 6, wherein the first augmented reality session and the second augmented reality session are different augmented reality sessions.

9. The method of claim 6, wherein the information stored regarding the created virtual object comprises identification of each component of the virtual object.

10. The method of claim 9, wherein the information stored regarding the created virtual object further comprises user-modified attributes.

11. The method of claim 6, further comprising:
storing augmented reality experience information for components of the created virtual object comprising at least one of display characteristics, audio characteristics, or associated functionality at various scales.

12. The method of claim 6, wherein storing information regarding the created virtual object comprises storing an identification of components and their relation to one another which is utilized with the second scale to generate the information for display of the virtual object at the second scale.

13. The method of claim 6, wherein storing information regarding the created virtual object comprises storing information for the created virtual object at the first scale, and, storing information for the created virtual object at the second scale.

14. A computer storage media storing computer-readable instructions that, when executed, cause a computing device to:
receive input from one or more users creating a virtual object at a first scale during a first augmented reality session;
store information regarding the created virtual object;
receive user input to experience the created virtual object at a second scale during a second augmented reality session; and
during the second augmented reality session, provide information for display of the virtual object at the second scale based, at least in part, upon the stored information regarding the created virtual object, wherein the first scale is different than the second scale and functionality of at least a portion of the virtual object is different when experienced at the second scale than when experienced at the first scale.

15. The computer storage media of claim 14, wherein the information stored regarding the created virtual object comprises identification of each component of the virtual object.

16. The computer storage media of claim 14, storing further computer-readable instructions that, when executed, cause the computing device to:
store augmented reality experience information for components of the created virtual object comprising at least one of display characteristics, audio characteristics, or associated functionality at various scales.

17. The computer storage media of claim 14, wherein storing information regarding the created virtual object comprises storing an identification of components and their relation to one another which is utilized with the second scale to generate the information for display of the virtual object at the second scale.

18. The computer storage media of claim 14, wherein storing information regarding the created virtual object comprises storing information for the created virtual object at the first scale, and, storing information for the created virtual object at the second scale.

19. The computer storage media of claim 14, wherein the portion of the virtual object is stationary when experienced at the first scale and moveable when experienced at the second scale.

20. The computer storage media of claim 19, wherein the portion of the virtual object comprises a door that is stationary when experienced at the first scale and can open and close when experienced at the second scale.

* * * * *